(12) United States Patent
Mathur et al.

(10) Patent No.: US 11,261,973 B2
(45) Date of Patent: Mar. 1, 2022

(54) SEAL HAVING UNDULATING SEAL COMPONENT AND SYSTEMS, ASSEMBLIES, AND METHODS THEREOF

(71) Applicant: Caterpillar Inc., Peoria, IL (US)

(72) Inventors: Anish Mathur, Urbana, IL (US); Ryan P. Morge, Clinton, IL (US); Gabriel Sbravatti Ferreira, Peoria, IL (US); David W. Holthaus, Monticello, IL (US); Mark J. Kiesel, Peoria, IL (US); Christopher A. Monroe, Mt Zion, IL (US)

(73) Assignee: Caterpillar Inc., Peoria, IL (US)

( * ) Notice: Subject to any disclaimer, the term of this patent is extended or adjusted under 35 U.S.C. 154(b) by 71 days.

(21) Appl. No.: 16/803,681

(22) Filed: Feb. 27, 2020

(65) Prior Publication Data

US 2021/0270374 A1 Sep. 2, 2021

(51) Int. Cl.
| | | |
|---|---|---|
| *F16J 15/52* | (2006.01) | |
| *F16J 15/02* | (2006.01) | |
| *B60G 7/00* | (2006.01) | |
| *B60G 3/06* | (2006.01) | |

(52) U.S. Cl.
CPC ............. *F16J 15/52* (2013.01); *B60G 3/06* (2013.01); *B60G 7/001* (2013.01); *B60G 7/005* (2013.01); *F16J 15/022* (2013.01); *B60G 2204/416* (2013.01)

(58) Field of Classification Search
CPC .......... F16J 15/52; F16J 15/022; B60G 7/005; B60G 7/001; B60G 3/06; B60G 2204/416
See application file for complete search history.

(56) References Cited

U.S. PATENT DOCUMENTS

| | | | | |
|---|---|---|---|---|
| 3,027,182 A | * | 3/1962 | Franz | F16C 11/0633 403/134 |
| 3,255,838 A | | 6/1966 | Goldman | |
| 4,553,760 A | * | 11/1985 | Reed | F16C 11/0666 180/9.5 |
| 4,663,960 A | * | 5/1987 | Makkink | G01F 25/0092 73/1.36 |
| 5,066,159 A | * | 11/1991 | Urbach | F16C 11/0666 403/134 |
| 6,357,956 B1 | | 3/2002 | Zebolsky et al. | |
| 6,551,282 B1 | * | 4/2003 | Exline | A61B 17/3462 604/167.01 |
| 6,644,883 B2 | | 11/2003 | Davis | |

(Continued)

FOREIGN PATENT DOCUMENTS

| | | |
|---|---|---|
| CH | 202402638 U | 8/2012 |
| CH | 203142778 U | 8/2013 |

(Continued)

*Primary Examiner* — Darlene P Condra
(74) *Attorney, Agent, or Firm* — Oblon, McClelland, Maier & Neustadt (57) ABSTRACT

A sealing comprises a seal portion and a plate portion fixed to the seal portion. The seal portion can have an undulating configuration of at least one peak and at least one valley, and the plate portion can circumferentially surround the seal portion. The seal portion can be made of a first material and the plate portion can be made of a second material more rigid than the first material. The seal portion can have a radially inward facing contact surface that defines a central opening of the sealing.

19 Claims, 9 Drawing Sheets

(56) References Cited

U.S. PATENT DOCUMENTS

| | | | |
|---|---|---|---|
| 6,702,787 B2* | 3/2004 | Racenet | A61B 17/34 |
| | | | 604/158 |
| 7,192,214 B2* | 3/2007 | Schonhoff | F16C 11/0671 |
| | | | 403/122 |
| 8,714,571 B2* | 5/2014 | Nataraj | B60G 7/001 |
| | | | 280/124.107 |
| 9,109,702 B2 | 8/2015 | Mathew et al. | |
| 2004/0028302 A1* | 2/2004 | Abels | F16C 11/0671 |
| | | | 384/206 |
| 2005/0042022 A1* | 2/2005 | Abels | F16C 11/0671 |
| | | | 403/134 |
| 2007/0059092 A1 | 3/2007 | Elterman et al. | |
| 2008/0181719 A1* | 7/2008 | Gleason | F16C 31/02 |
| | | | 403/76 |
| 2011/0293360 A1* | 12/2011 | Becker | F16C 11/045 |
| | | | 403/161 |
| 2014/0016888 A1* | 1/2014 | Harper | F16C 23/045 |
| | | | 384/147 |
| 2015/0322999 A1* | 11/2015 | Brunneke | |
| 2017/0276169 A1 | 9/2017 | Parker, Jr. et al. | |
| 2018/0258983 A1 | 9/2018 | Reddehase et al. | |
| 2019/0291526 A1 | 9/2019 | Kuroda | |

FOREIGN PATENT DOCUMENTS

| | | |
|---|---|---|
| CH | 208198577 U | 12/2018 |
| DE | 10 2016 207 957 A1 | 11/2017 |
| KR | 20190123490 | 11/2019 |

* cited by examiner

SEAL HAVING UNDULATING SEAL COMPONENT AND SYSTEMS, ASSEMBLIES, AND METHODS THEREOF

TECHNICAL FIELD

The present disclosure relates to seals with an undulating seal component and systems, assemblies, and methods thereof.

BACKGROUND

Debris and contamination can negatively impact bearing life, and may ultimately lead to a seized or failed bearing. Gapping may occur at one or more seal interfaces of the bearing, especially in the context of an off-road application where extreme tilt and rotation are more frequent, which can allow debris and contamination to enter the sealed environment.

U.S. Pat. No. 9,109,702 ("the '702 patent") describes a boot seal for a ball joint. According to the '702 patent, the boot seal seals a first component having a steering arm and a second component having a linkage rod to actuate the first component to prevent the intrusion of water, dirt, etc. A body wall of a seal body is deformable in response to axial compression to a squished configuration, where the body wall forms a radially outward bulge to bias a sealing ring against the first component. Another sealing ring is provided at an opposite axial end of the body wall, in a cavity of the second component.

SUMMARY OF THE DISCLOSURE

In one aspect, the present disclosure provides or implements a circular planar seal. The circular planar seal can comprise a seal portion having an undulating configuration of alternating peaks and valleys in a radial direction; and a plate portion fixed to the seal portion and circumferentially surrounding the seal portion. The seal portion can be made of a first material and the plate portion can be made of a second material more rigid than the first material, and the seal portion can have a radially inward facing contact surface that defines a central opening of the circular planar seal.

In another aspect, a seal assembly can be provided or implemented. The seal assembly can be configured to sealingly enclose a cavity within which a spherical bearing linkage is provided. The seal assembly can comprise a seal portion having an undulating configuration of at least one peak and at least one valley in a radial direction; a plate bonded to the seal portion and circumferentially surrounding the seal portion; an outer ring circumferentially surrounding the plate and the seal portion; and a lip seal sealingly coupled to a radially inward facing surface of the outer ring and a radially outward facing surface of the plate.

And in another aspect, a suspension system can be provided or implemented. The suspension system can comprise a control arm configured to extend primarily horizontally, the control arm defining a cavity and having a mounting surface surrounding a rim of the cavity; a spindle operatively coupled to the control arm and configured to extend primarily vertically, the spindle having an end portion provided in the cavity of the control arm and a body portion provided outside the cavity of the control arm; a ball provided at the end portion of the spindle and configured to tilt in correspondence with tilting of the spindle; and a seal assembly provided outside the cavity and sealingly coupled to the mounting surface of the control arm and an outer circumferential surface of the spindle. The seal assembly can include an undulating seal surrounding a circumference of the spindle and provided in friction-fit contact with the outer circumferential surface of the spindle, the undulating seal having an undulating configuration of alternating peaks and valleys, a metallic plate bonded to the undulating seal at least at an outer peripheral surface of the undulating seal, and an outer ring fixedly coupled to the mounting surface of the control arm and circumferentially surrounding the metallic plate and the undulating seal. The metallic plate bonded to the undulating seal can be configured to rotate in combination relative to the mounting surface of the control arm.

Aspects can also involve or implement methods of providing, making, and/or using seals, seal assemblies, and suspension systems according to embodiments of the disclosed subject matter.

Other features and aspects of this disclosure will be apparent from the following description and the accompanying drawings.

DETAILED DESCRIPTION

Generally, the present disclosure relates to seals with an undulating seal component and systems, assemblies, and methods thereof.

Figure 1:
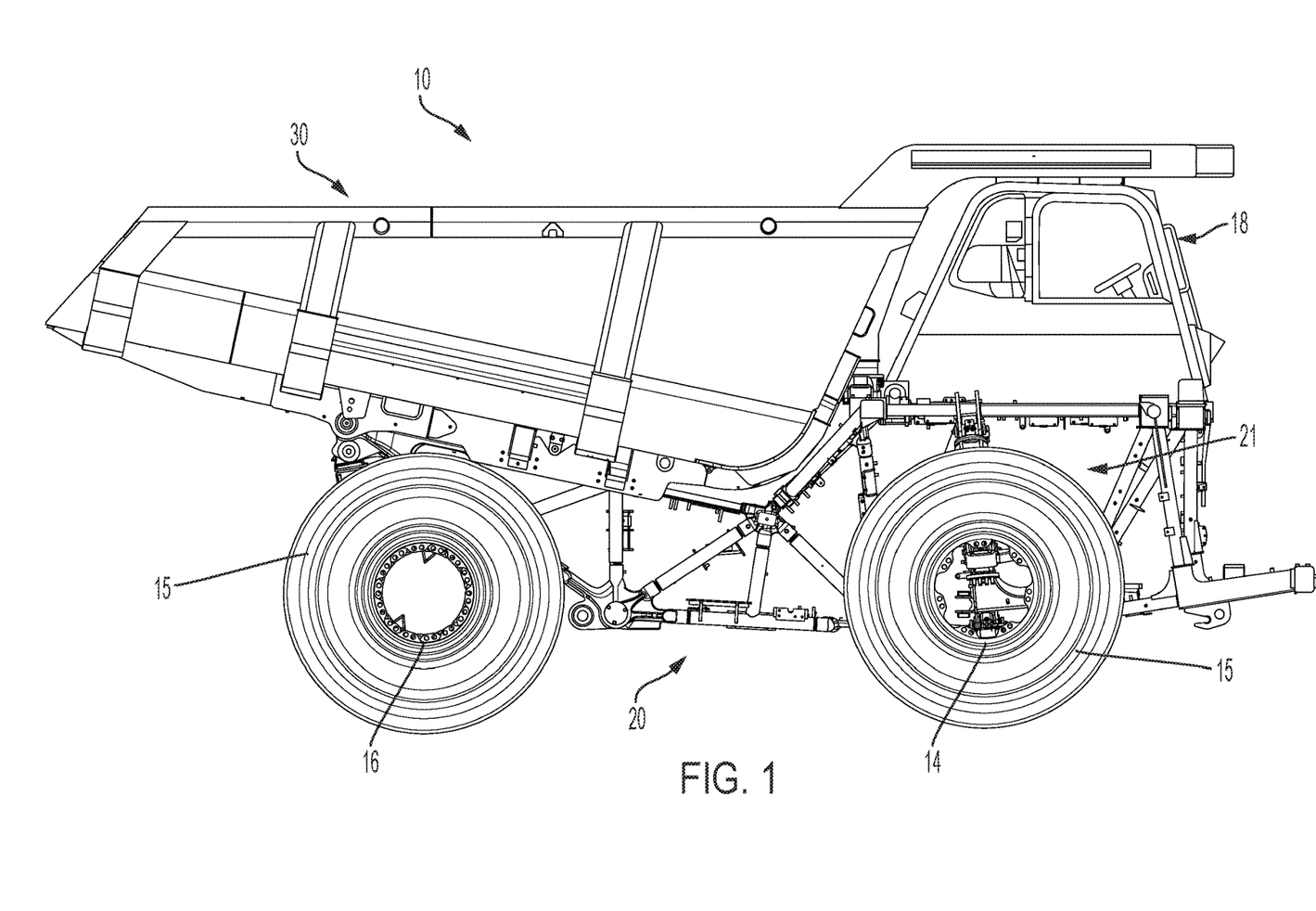
FIG. 1 illustrates a side view of a machine according to embodiments of the disclosed subject matter.

Referring now to the drawings and with specific reference to FIG. 1, this figure illustrates an exemplary embodiment of a machine 10. Machine 10 may be a mobile machine that performs some type of operation associated with an industry such as mining, construction, or any other industry known in the art. For example, as shown in FIG. 1, machine 10 may be an earth moving machine, particularly, an off-highway rear haul truck 10.

Machine 10 may have a space frame 20 supported by front wheels 14 and rear wheels 16 including respective tires 15. The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

Machine 10 may have an operator cabin 18 supported by the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in the forward or rearward direction.

In general, a space frame 20 may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 2:
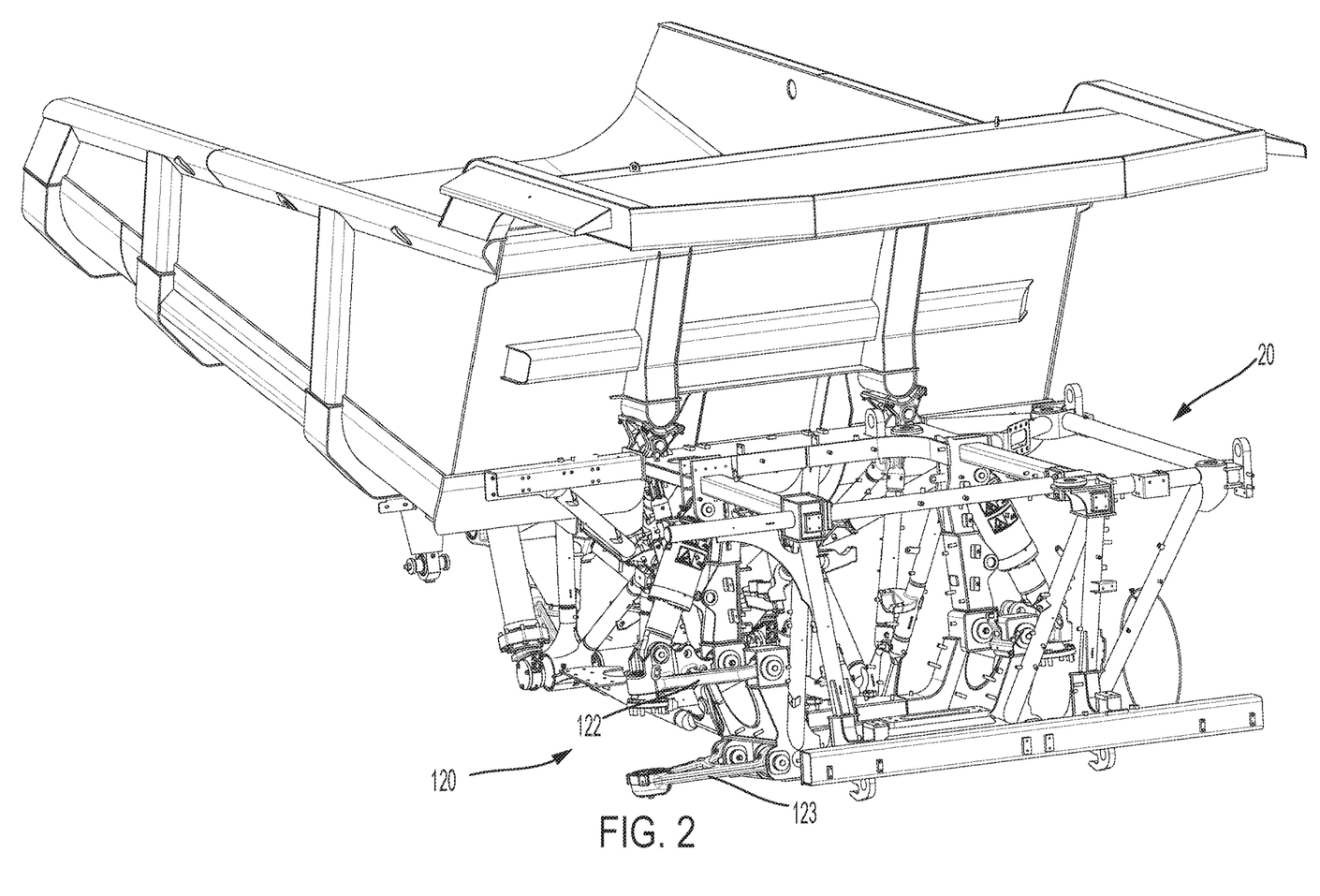
FIG. 2 is a front, side view of a dump body positioned on a space frame having coupled thereto a suspension arm according to embodiments of the disclosed subject matter.

Turning to FIG. 2, the space frame 20 can interface with suspension systems of the machine 10, including a front suspension system 120 (which can be provided on opposite sides of the space frame 20). Front suspension system 120 can include a plurality of control arms, including control arm 122 and control arm 123. In general, the control arm 122 and the control arm 123, which can extend primary horizontally (i.e., more horizontal than vertical), can rotate generally vertically with respect to the space frame 20. According to one or more embodiments, the control arm 122 and the control arm 123 may be characterized or called an upper A-arm and a lower A-arm, respectively. Incidentally, though a suspension system is described with respect to the figures, embodiments of the disclosed subject matter are not so limited and can be applicable to other linkages having a spherical bearing.

Figure 3:
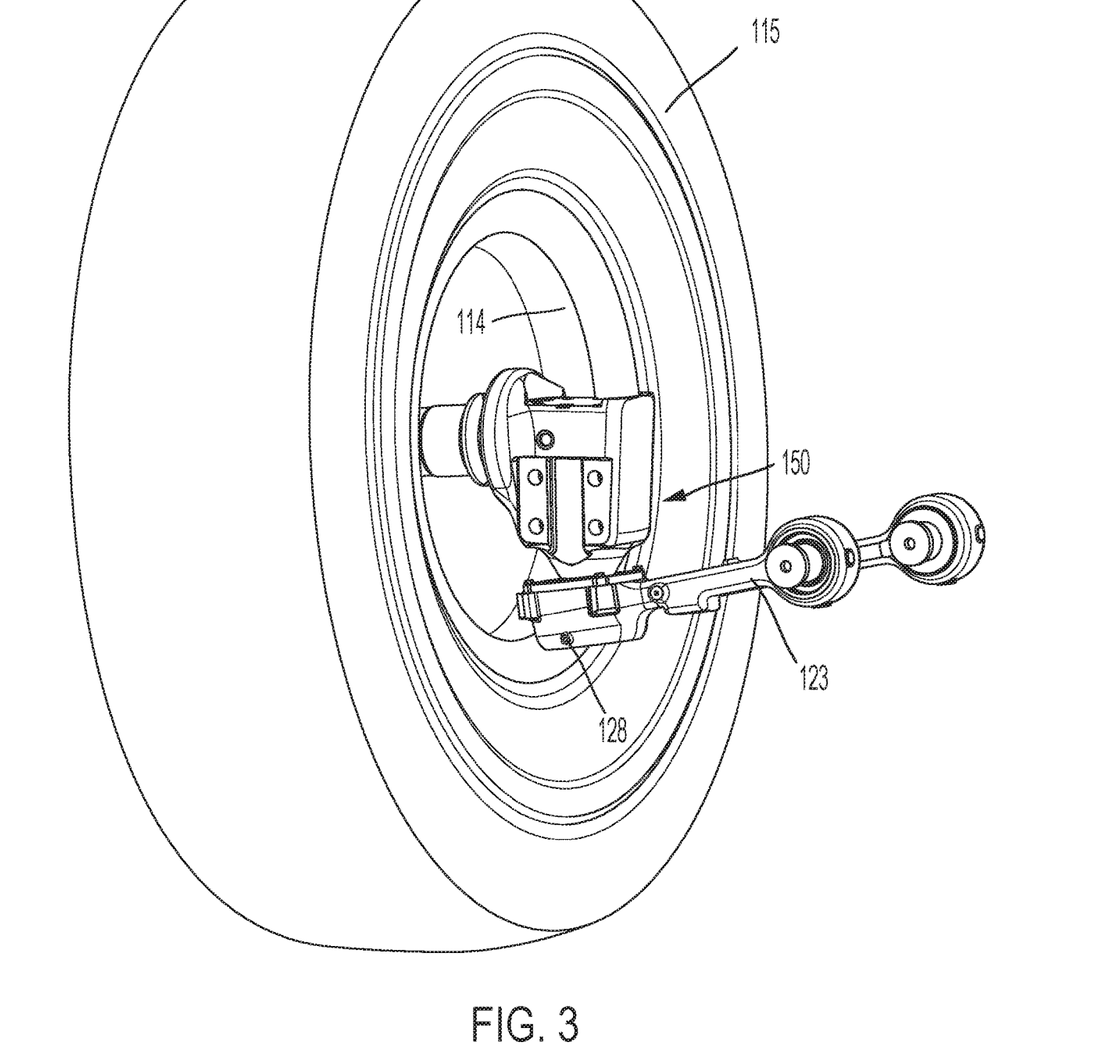
FIG. 3 is a rear view of the suspension arm of FIG. 2 relative to a tire.
Figure 4:
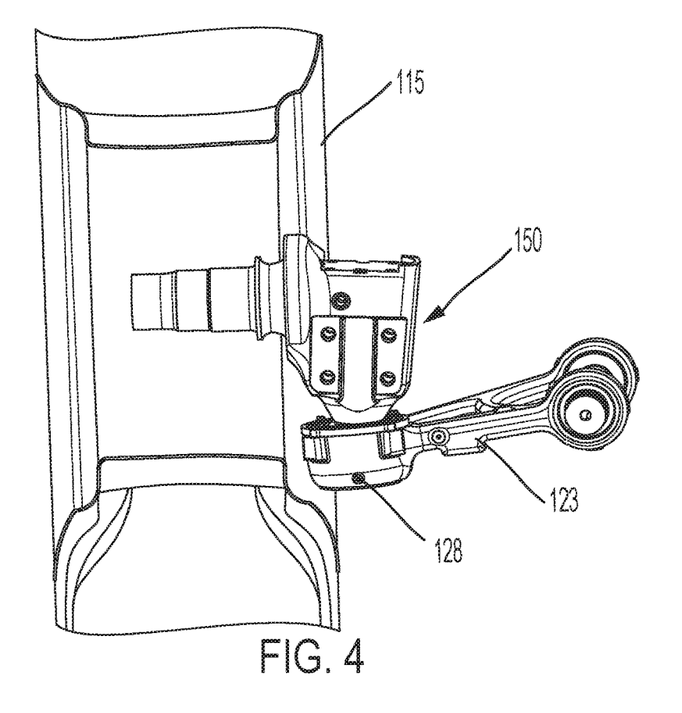
FIG. 4 is another rear view of the suspension arm of FIG. 2 relative to the tire (in a sectional view of the tire).
Figure 5:
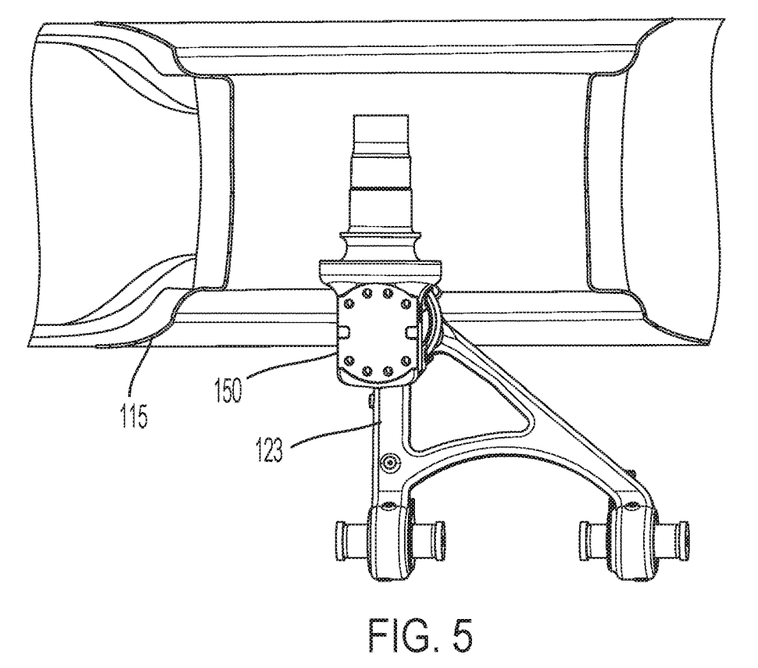
FIG. 5 is an overhead view of the suspension arm of FIG. 2 relative to the tire (in another sectional view of the tire).

As shown in FIGS. 3-5, the control arm 123 can interface with a spindle assembly 150. Note that only a lower portion of the spindle assembly 150 is shown. A top portion of the spindle assembly 150 can interface with the control arm 122. The spindle assembly 150 can also interface with the wheel 114, via an axle and other connections connecting the wheel 114 to the spindle assembly 150. As shown in FIGS. 3-5, the spindle assembly 150 can extend primary vertically (i.e., more vertical than horizontal).

Figure 6:
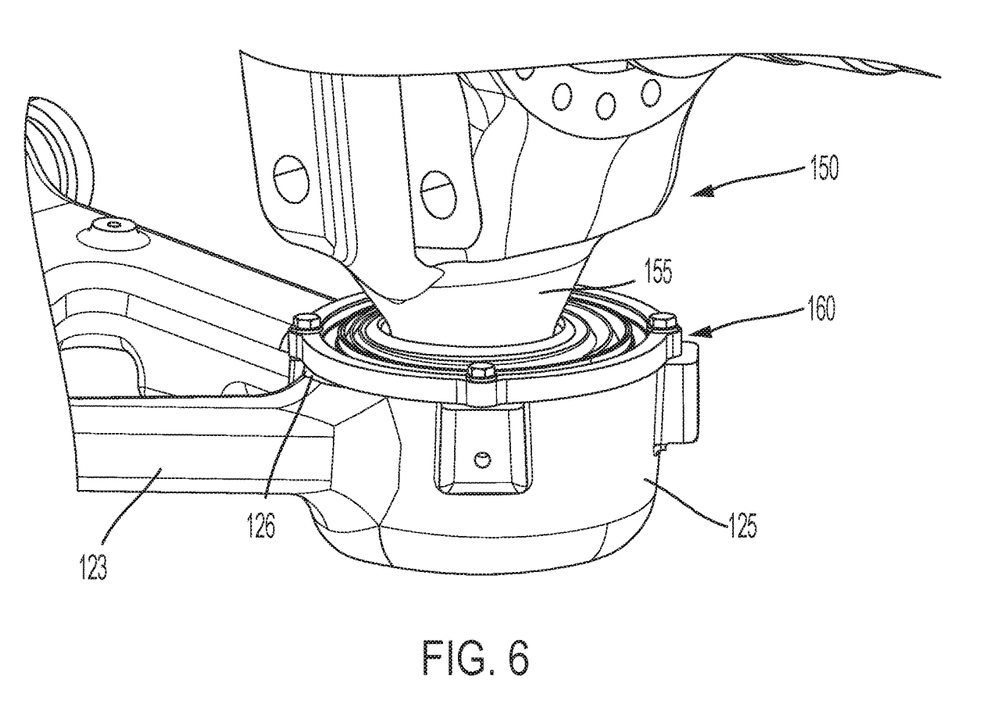
FIG. 6 is a perspective view of a suspension system or assembly according to embodiments of the disclosed subject matter.

Turning to FIG. 6, the control arm 123 can have a receptacle 125 that operatively interfaces with a portion of the spindle assembly 150. Such operative interface can involve the control arm 123 (and the receptacle 125) rotating relative to a longitudinal axis of a spindle 155 of the spindle assembly 150 (e.g., during turning operations of the machine 10) and the spindle 155 tilting vertically relative to the receptacle 125 (e.g., during collapse and expansion of the front suspension system 120). Incidentally, though the term spindle 155 is described with respect to the figures, embodiments of the disclosed subject matter are not so limited and can be applicable to other spherical bearing linkages.

A seal assembly 160 can be provided relative to the operative interface between the spindle assembly 150 and the receptacle 125, such as shown in FIG. 6. Discussed in more detail below, the seal assembly 160 can be provided on a mounting surface 126 of the receptacle 125, which may be characterized as an external surface of the receptacle (even though the seal assembly 160 is provided thereon), and a circumference of the spindle 155 can be circumferentially or radially surrounded by the seal assembly 160. Additionally, a portion of the spindle 155 can extend into the receptacle 125, to a height below the seal assembly 160. Also discussed in more detail below, the seal assembly 160 can be fixedly coupled to the mounting surface 126. For example, the seal assembly 160 can be fixedly coupled to the mounting surface 126 by a plurality of fasteners, such as bolts threaded into the receptacle 125 as in FIG. 6. Such fixed coupling can form a seal between the seal assembly 160 and the mounting surface 126.

Figure 7:
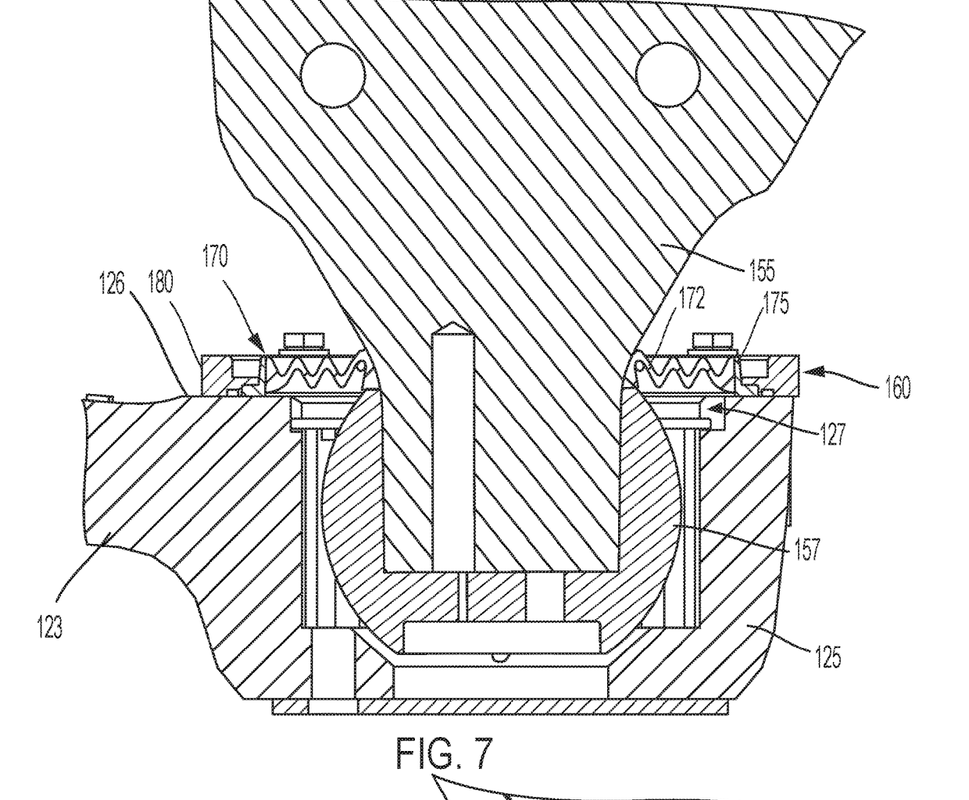
FIG. 7 is a sectional view of the suspension system or assembly of FIG. 6.

Turning to FIG. 7, this figure shows a sectional view of the interface between the spindle assembly 150 and the receptacle 125. The control arm 123, particularly the receptacle 125 thereof, can define a cavity 127, and the mounting surface 126 can surround or define a rim of the cavity 127. As shown, the seal assembly 160 can be provided outside of the cavity 127, for instance, entirely outside of the cavity 127. Further, the seal assembly 160 may be provided outside the cavity 127 at all times, or, alternatively, only in certain circumstances, such as in an unloaded state as shown in FIG. 7. In some instances, such as when the spindle 155 tilts (e.g., in a full extended or full collapsed state), a portion of the seal assembly 160 may enter the cavity 127.

The spindle 155 can have an end portion provided in the cavity 127 and a body portion provided outside the cavity 127 (in this exemplary orientation above the cavity 127). A ball 157, which may be part of the spindle 155 or may be a component separate from the spindle 155, can be provided at the end portion of the spindle 155. According to one or more embodiments, the ball 157 can be fixedly coupled to the end portion of the spindle 155. Generally, the ball 157 can be held in the cavity 127 so as to form a so-called ball and socket joint or interface operatively coupling the spindle assembly 150 and the control arm 123. Hence, the ball 157 may be characterized as a bearing.

A lubricant may be provided in the cavity 127. Non-limiting examples of lubricants include grease or oil. Optionally, the receptacle 125 can include a port 128 (see FIG. 3 and FIG. 4). The port 128 can be used to introduce the lubricant to the cavity 127 (and the seal assembly 160, as discussed in more detail below). Alternatively, lubricant can be provided in the cavity 127 upon assembly of the spindle assembly 150 to the control arm 123.

Figure 8:
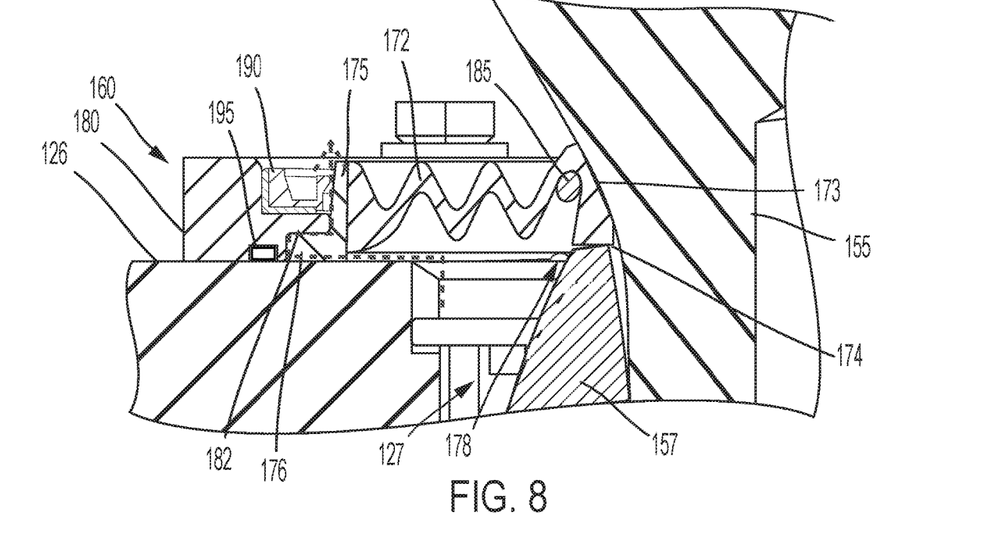
FIG. 8 is an enlarged view of a portion of the sectional view of FIG. 7 to show a seal assembly according to one or more embodiments of the disclosed subject matter.

The seal assembly 160 can include a seal 170, which can be comprised of a seal portion 172 and a plate or plate portion 175, an outer ring 180, and a retaining ring 185. Though not expressly shown in FIG. 6 and FIG. 7, the seal assembly 160 can also include a lip seal 190, such as shown in FIG. 8. Optionally, the seal assembly 160 can have an O-ring or seal 195, such as shown in FIG. 8.

The outer ring 180 can provide a radially outer-most portion of the seal assembly 160. As shown in FIG. 7, the outer ring 180 can circumferentially or radially surround the plate 175 and the seal portion 172. The outer ring 180 can also circumferentially or radially surround the lip seal 190. As discussed above, the outer ring 180 can be fixedly coupled to the mounting surface 126. For example, the outer ring 180 can be mounted to the mounting surface 126 by a plurality of fasteners, such as bolts threaded into the receptacle 125. Optionally, in a side elevational view of the seal assembly 160, at least one portion of the seal portion 172 (e.g., an inner-most peak) can extend past the outer ring 180, i.e., extend past the outer ring 180 in a height or thickness direction. Such extending may be in an unloaded state dictating the configuration of the seal assembly 160. On the other hand, the outer ring 180 may have a thickness or height greater than that of an initial interface between the seal portion 172 and the plate 175. Alternatively, the seal portion 172 may be entirely within the thickness or height of the outer ring 180 when in the unloaded state and/or in a loaded or stretched/compressed state, such as a collapsed state or an extended state of the front suspension system 120.

The O-ring 195 may be provided in a cut-out on a bottom surface of the outer ring 180 so as to be between the outer ring 180 and the mounting surface 126 of the receptacle 125, particularly on the mounting surface 126. The O-ring 195 may also be provided radially outward of the plate 175, such as shown in FIG. 8. Thus, the O-ring 195 can also circumferentially or radially surround the plate 175 and the seal portion 172. Optionally, the O-ring 195 may not touch the plate 175 (e.g., a barrier, such as a portion of the outer ring 180, may be provided between the O-ring 195 and the plate 175).

The lip seal 190 can be provided between the plate 175 and the outer ring 180. More specifically, the lip seal 190 can be provided at an radially outward facing surface of the plate 175 and a radially inward facing surface of the outer ring 180. As shown in FIG. 8, for instance, the lip seal 190 can be provided on a ledge 182 of the outer ring 180, which can project or extend radially inward toward the radially outward facing surface of the plate 175. The lip seal 190 can be sealingly coupled to the outer ring 180 and the plate 175, though, as discussed in more detail below, may provide a one-way valve at an interface with the plate 175 as an output for lubricant arriving from the cavity 127 via a path.

The plate 175, which may be metallic or made from metal, such as steel, can circumferentially or radially surround the seal portion 172. According to one or more embodiments, the plate 175 can be provided in contact with the seal portion 172 so as to cover an entire radially outward facing or peripheral surface of the seal portion 172, such as shown in FIG. 8. More specifically, the plate 175 can be fixedly coupled to the seal portion 172, for instance, to cover an entire radially outward facing surface of the seal portion 172. For example, the plate 175 can be bonded to the seal portion 172 via an adhesive or heat bonding.

As noted above, the plate 175 can be radially inward of the lip seal 190, and at least a portion of the outer ring 180. According to one or more embodiments, the plate 175 may have a ledge 176, which may define an outer circumference of the plate 175, that can be provided between the mounting surface 126 of the receptacle 125 and the seal portion 172 (e.g., via ledge 182 of the outer ring 180). Though the plate 175 can have a bottom surface that contacts the mounting surface 126, the plate 175 can be configured to rotate along the mounting surface 126.

Figure 9:
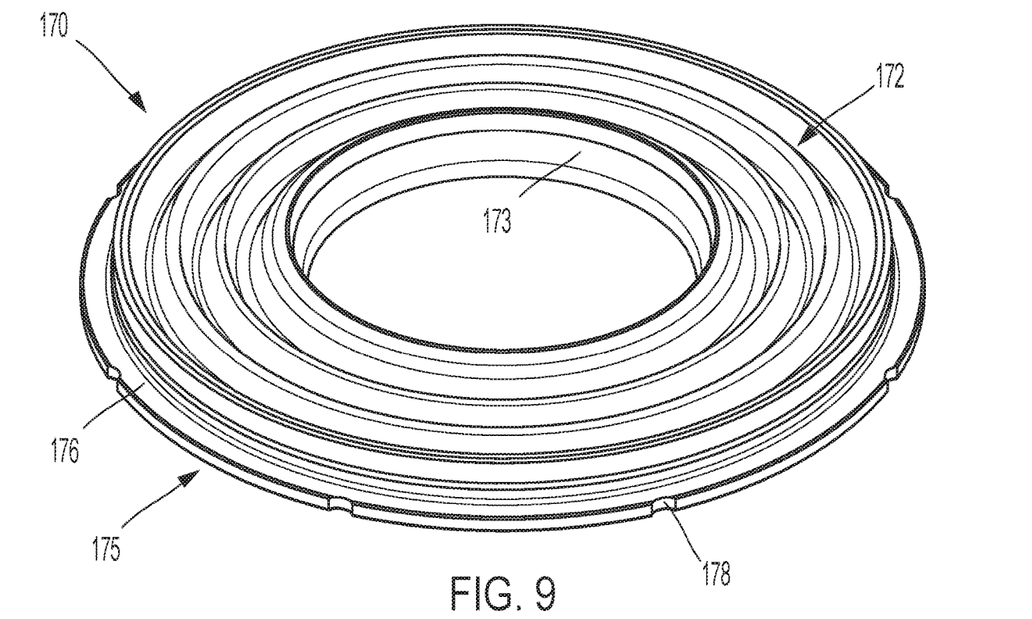
FIG. 9 is a top perspective view of a seal of the seal assembly of FIG. 8, according to one or more embodiments of the disclosed subject matter.
Figure 10:
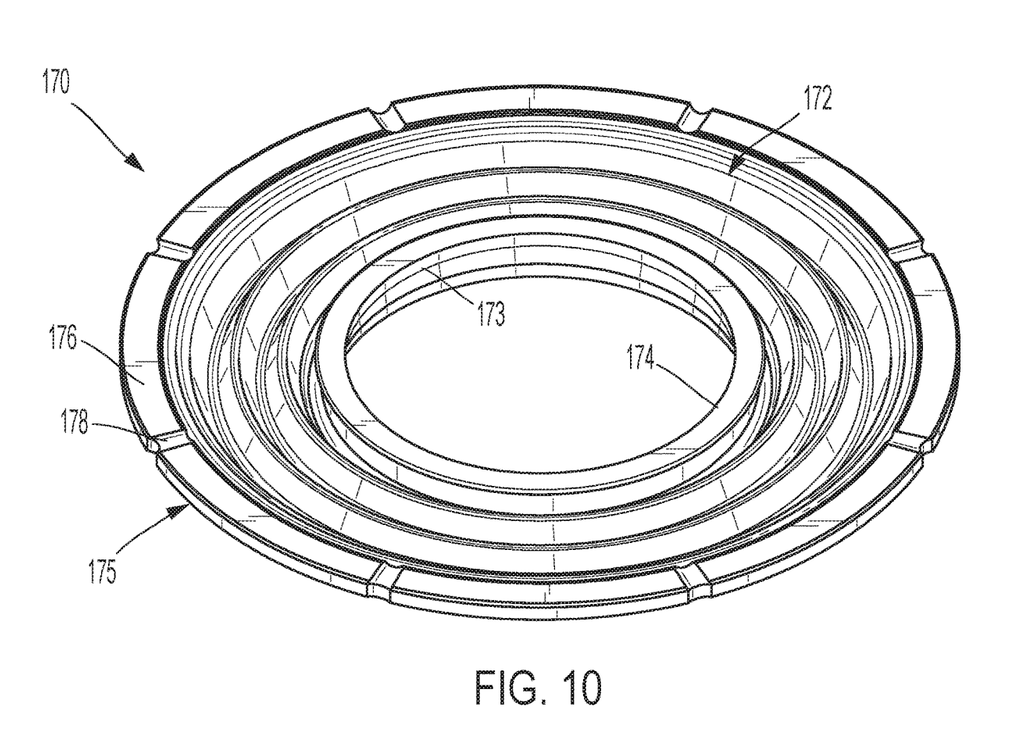
FIG. 10 is a bottom perspective view of the seal of FIG. 9.

Discussed in more detail with respect to FIG. 9 and FIG. 10, the plate 175 may have one (e.g., only one) or more cutouts or channels 178 (FIG. 9 and FIG. 10 show a plurality of channels 178). The channels 178 can be provided at bottom surface of the plate 175 and a side surface of the plate 175, particularly the radially outward facing side surface of the ledge 176. Each of the channels 178 can extend in a radial direction, from an inner circumference of the plate 175 to an outer circumference of the plate 175 at the radially outward facing side surface of the ledge 176. Optionally, according to one or more embodiments, the channels 178 can extend radially along a top surface of the ledge 176. Also discussed in more detail below, the channels 178 can form part of a path for lubricant. In one or more embodiments, each channel 178 can be comprised of two portions, a first portion at the bottom surface of the plate 175 and a second portion in the radially outward facing side surface of the ledge 176. Thus, the first portion can extend or run horizontally and the second portion can extend or run vertically. Optionally, a third portion can be provided on the top surface of the ledge 176. Optionally, a path for the lubricant can be provided radially outward of the ledge 176, for instance, in a case where the outer diameter of the plate 175 is spaced or has clearance relative to the outer ring 180. Alternatively, no channels 178 may be provided, which can mean that the path for the lubricant can run under the bottom surface of the plate 175 and along the contour of the ledge 176 and then vertically along the vertical portion of the plate 175.

The seal portion 172 can be radially inward of the plate 175. The seal portion 172 can be fixedly coupled to the plate 175, for instance, via bonding, as noted above. The seal portion 172 can have an undulating configuration, for instance, in a radial direction from the plate 175 radially inward (or radially outward toward the plate 175). According to one or more embodiments, the undulating configuration can be an undulating configuration of alternating peaks and valleys (including or consisting of at least one peak and at least one valley). Optionally, the undulating configuration of the seal portion 172 can be according to an equation for a parabolic shape. According to one or more embodiments, the undulations of the seal portion 172 can be characterized as ripples. Hence, the seal portion 172 may be called or characterized as a ripple seal. Additionally or alternatively, a path (or paths) for lubricant to the interface between the plate 175 and the mounting surface 126 can be provided by way of one or more grooves in the mounting surface 126 and an inner diameter of the outer ring 180.

On a radially outer or circumference side of the seal portion 172, on a bottom side of the seal portion 172, a step can be provided at the interface between the seal portion 172 and the plate 175. That is, a bottom peripheral edge of the seal portion 172 can be recessed or offset relative to a bottom surface of the plate 175. Alternatively, the bottom peripheral edge of the seal portion 172 can be either flush with the bottom surface of the plate 175 or below the bottom surface of the plate 175 such that the bottom surface of the plate 175 is recessed or offset relative to a bottom surface of the seal portion 172.

Opposite the radially outer side of the seal portion 172, forming a radially inner-most portion of the seal portion 172 (and the seal assembly 160) and defining a central opening of the seal assembly 160, the seal portion 172 can define a contact or engagement surface or face 173. A contact surface 174 can be provided below the engagement face 173.

As shown in FIG. 7, the seal portion 172 can surround the spindle 155. Moreover, the seal portion 172 can surround the spindle 155 so as to engage the circumference of the spindle 155. For example, the engagement face 173 of the seal portion 172 can be provided in friction-fit contact with an outer circumference of the spindle 155. Such friction fit contact can be such that the engagement face 173 of the seal portion 172 can rotate with rotation of the spindle 155. According to one or more embodiments, the engagement face 173 can have an increased surface area as compared to other dimensions of the seal portion 172 in a height or thickness direction of the seal portion 172. Such increased surface area can provide an increased friction interface to maintain engagement of the engagement face 173 to the spindle 155.

Optionally, the retaining ring 185 can be provided relative to the seal portion 172 and the spindle 155. For example, the retaining ring 185 can be provided on a side of the seal portion 172 facing the cavity 127. More specifically, the retaining ring 185 can be provided in one of the valleys of the seal portion 172 closest to the spindle 155, such as shown in FIG. 7 and FIG. 8. The retaining ring 185 can be configured to provide a retaining force (e.g., compressive force) against the seal portion 172 to hold the seal portion 172 against the spindle 155.

The contact surface 174 of the portion seal 172, which may be characterized as a peak of the undulation of the seal portion 172, can contact the ball 157, such as shown in FIG. 7 and FIG. 8. Such contact can be such that the ball 157, at the very least, can prevent the seal portion 172 from falling down the spindle 155. According to one or more embodiments, the contact can be positive, where the ball 157 pushes up on the contact surface 174, to force a positive fit or lock of the seal portion 172 on the spindle 155. Additionally, such contact can be around an entire circumference of the contact surface 174, such as in an unloaded state (i.e., spindle 155 vertical or substantially vertical), or around a portion of the circumference of the contact surface 174, such as when in an extended state or a collapsed state. Thus, though the ball 157 may continuously contact the contact surface 174, the contact surface 174 and the ball 157 may not be fixed or adhered to each other.

Embodiments of the disclosed subject matter can provide a path for lubricant. FIG. 8 shows, via the dashed arrow line, an exemplary path for lubricant according to embodiments of the disclosed subject matter. In general, the path can include lubricant exiting the cavity 127 and traveling radially outward under the plate 175. The lubricant can travel radially outward via the channels 178 in the plate 175, for instance, and to some extent between the channels 178, if present, on a bottom surface of the plate 175. The path may then run upward, between the outer ring 180 and the plate 175 (including in the vertical channels 178 in the ledge 176). The path may then proceed between the lip seal 190 and the plate 175 (e.g., in optional horizontal channels 178 on the top surface of the ledge 176), and then to an external side of the seal assembly 160. According to one or more embodiments, the lip seal 190 can form a one-way seal by which lubricant can purge out of the seal assembly 160 and external contaminants, such as dirt and water, can be prevented from entering the seal assembly 160 via the lip seal 190 and interfaces therewith. The lip seal 190 can provide the one-way seal via a one-way valve configuration formed in a body of the lip seal 190, for instance, at an interface of the lip seal 190 with the seal 170, particularly a vertically extending portion of the plate 175.

Turning to FIG. 9 and FIG. 10, these figures show top and bottom perspective views of seal 170 according to embodiments of the disclosed subject matter. As shown, the seal 170 can be ring-shaped and define a central opening. The central opening can be configured to receive the spindle 155. In that the seal 170 can extend primarily in a radial direction, the seal 170 may be characterized as planar or having a plate configuration.

As noted above, the seal 170 can be comprised of the seal portion 172 and the plate 175. Also as noted above, the seal portion 172 can be fixed to the plate 175, for instance, bonded to the plate 175 using an adhesive. The plate 175 and the seal portion 172 can be made of different material. For example, the plate 175 can be made of a material having a rigidity greater than a rigidity from which the seal portion 172 is made. Generally, the seal 170 can be stiff enough to allow rotation of the seal 170 with the spindle 155 through steering motions and flexible enough to flex when the spindle 155 tilts during suspension travel. According to one or more embodiments, the seal portion 172 can be made of a non-metal material, such as rubber, an elastomer, a polyurethane elastomer, or polyurethane (e.g., polyurethane shore 90), and the plate 175 can be metallic or metal, such as steel.

FIG. 9 and FIG. 10 also show a plurality of the channels 178. As noted above, the channels 178 can extend radially outward from a radially inner-most surface of the plate 175, at a bottom surface of the plate 175, to the outer circumference of the plate 175, i.e., at the ledge 176, and vertically along the edge of the ledge 176. Optionally, the channels 178 can extend radially along a top surface of the ledge 176 (not expressly shown). According to one or more embodiments, the channels 178 can be evenly spaced around the plate 175, such as shown in FIG. 9 and FIG. 10.

Figure 11:
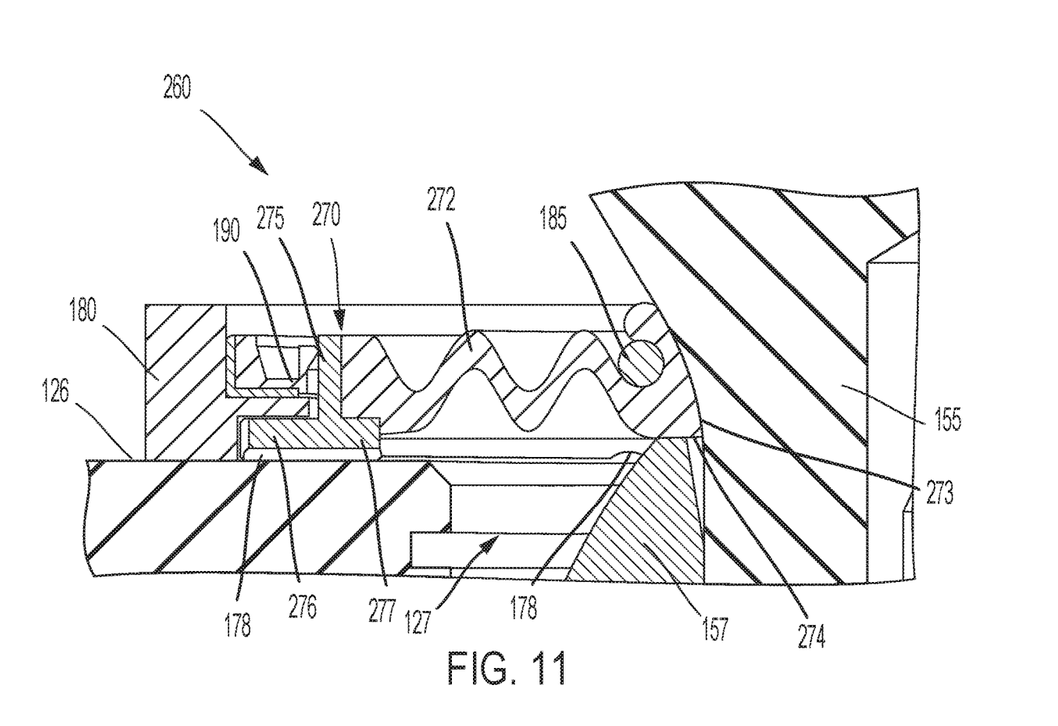
FIG. 11 is an enlarged view of a portion of the sectional view of FIG. 7 to show another embodiment of a seal assembly.

FIG. 11 is an enlarged view of a portion of the sectional view of FIG. 7 to show another embodiment of a seal assembly 260.

Seal assembly 260 is similar to seal assembly 160 discussed above and can have the outer ring 180, the lip seal 190, and the retaining ring 185. Notably, however, the retaining ring 185 can be provided on the opposite side of a seal portion 272 of seal 270 as compared to the seal assembly 160, in this embodiment on an external side of the seal portion 272. In this regard, the radially innermost end portion of the seal portion 272 can be configured as shown in FIG. 11, to retain the retaining ring 185 in a valley closest to the engagement face 273 and the spindle 155. The contact surface 274 can contact the ball 157 as discussed above.

For the seal assembly 260 a plate 275 of the seal 270 can have a ledge 276, which extends radially outward from a vertically extending portion of the plate 275, and also a ledge 277, which extends radially inward from the vertically extending portion of the plate 275. The ledge 277 can be fixed to a corresponding cutout of the seal portion 272. According to one or more embodiments, the ledge 276 may be relatively longer than ledge 176 of seal assembly 260 because seal assembly 260 may not have an O-ring, such as O-ring 195.

The channels 178 can be provided in the bottoms of both the ledge 276 and the ledge 277 and a middle portion therebetween directly below the vertically extending portion (which alternatively may be considered part of the vertically extending portion). Thus, the channels 178 can extend continuously from the ledge 277 to the ledge 276 and then vertically upward in the ledge 276.

INDUSTRIAL APPLICABILITY

As noted above, the present disclosure relates to seals with an undulating seal component and systems, assemblies, and methods thereof.

Embodiments of the disclosed subject matter, generally, can decouple the sealing of rotational movement from the sealing of tilting movement. Thus, embodiments of the disclosed subject matter can accommodate for ranges of tilt (e.g., extreme tilt) and rotation angles associated with movement of a suspension system, for instance. Seals according to embodiments of the disclosed subject matter can be stiff enough to rotate through steering motions and also flexible enough for tilt during suspension travel, which in some cases may occur at the same time.

The seal assembly 160, 260 can be sealingly coupled to the spindle 155 and the control arm 123, particularly the receptacle 125 of the control arm 123, to sealingly enclose the cavity 127. Such sealing can prevent debris and contamination from entering the cavity 127 within which is provided a bearing interface between the receptacle 125 of the control arm 123 and the ball 157 coupled to the spindle 155 of spindle assembly 150.

In particular, the outer ring 180 can be sealingly coupled to the mounting surface 126 of the receptacle 125 by being fixed to the mounting surface 126 via a plurality of fasteners, such as bolts. Optionally, an O-ring 195 can be provided radially outward of the seal portion 172, 272 and an outer circumference of the outer ring 180, on the mounting surface 126. And the engagement face 173, 273 of the seal portion 172, 272 can frictionally engage the spindle 155, optionally under the retaining force of the retaining ring 185, where the engagement face 173, 273 can frictionally engage the spindle 155. According to one or more embodiments, the engagement face 173, 273 can define a relatively wide surface to provide a tight fit against the spindle 155 to prevent external contaminants (e.g., water) from passing and to establish sufficient friction to prevent rotation of the seal 170, 270 relative to the spindle 155 (the seal 170, 270 can rotate in correspondence with the spindle 155).

As noted above, according to one or more embodiments, the retaining ring 185 can provide a retaining force to the seal portion 172, 272 to retain the seal portion 172, 272 against the spindle 155. The retaining ring 185 can be provided in a valley of the undulating configuration of the seal portion 172, 272 closest to the engagement face 173, 273 and the spindle 155. According to one or more embodiments, the retaining ring 185 can be provided on a side of the seal portion 172, 272 facing the cavity 127. Such positioning can protect the retaining ring 185 from exposure from external contaminants, such as debris and water.

The plate 175, 275 which can be fixed to the seal portion 172, 272, can be retained by the ledge 182 of the outer ring 180. For example, the ledge 182 can extend radially inward over the ledge 176, 276 of the plate 175, 275 such as shown in FIG. 8 (and the embodiment of FIG. 11). Such retention of the plate 175, 275 (and hence the seal 170, 270, including the seal portion 172, 272) can prevent the seal 170, 270 from moving or substantially moving axially with the travel of the suspension, i.e., so the plate 175, 275 can be held against or prevented from losing contact with the mounting surface 126. However, based on the friction-fit coupling of the engagement face 173, 273 to the spindle 155, the seal 170, 270 can rotate about the control arm 123 in correspondence with the rotation of the spindle 155, for instance, during a steering motion of the spindle 155. According to one or more embodiments, in the event that the plate 175, 275 seizes or freezes to the mounting surface 126 during initial rotation of the spindle 155, the engagement face 173, 273 of the seal portion 172, 272 can rotate in correspondence with the spindle 155 while the undulating configuration of the body of the seal portion 172, 272 can accommodate a certain amount of the rotation before the plate 175, 275 breaks free and begins to rotate with the spindle 155.

Moreover, as noted above, lubricant (e.g., grease or oil) can be provided under the plate 175, 275, including within one or more channels 178, to facilitate rotation of the seal 170, 270. Regarding the lubricant, the one or more channels 178 can aide lubricant disbursement along the path from the cavity 127 to outside the seal assembly 160, 170 via the lip seal 190. The path can include lubricant exiting the cavity 127 and traveling radially outward under the plate 175, 275, via the channels 178, and to some extent between the channels, on a bottom surface of the plate 175, 275. The path may then run upward, between the outer ring 180 and the plate 175, 275, including in the vertical channels 178 in the ledge 176, 276. The path may then proceed between the lip seal 190 and the plate 175, 275, and then to an external side of the seal assembly 160, 260. The lip seal 190 can form a one-way seal by which lubricant can purge out of the seal assembly 160, 260 and external contaminants, such as dirt and water, can be prevented from entering the seal assembly 160, 260 via the lip seal 190 and interfaces therewith. The lip seal 190 can provide the one-way seal via a one-way valve configuration formed in a body of the lip seal 190, for instance, at an interface of the lip seal 190 with the seal 170, 270, particularly a vertically extending portion of the plate 175, 275.

The seal 170, 270, particularly the seal portion 172, 272 thereof, can be assisted in friction-fit contact with the spindle 155 by the ball 157. In particular, even when the spindle 155 tilts, the ball 157 can contact the contact surface 174, 274 of the seal portion 172, 272, thereby preventing the engagement face 173, 273 from moving or sliding axially downward on the spindle 155.

As noted above, seal assemblies according to embodiments of the disclosed subject matter, such as seal assemblies 160, 260, can accommodate tilting conditions of the spindle assembly 150 relative to the control arm 123.

Figure 12:
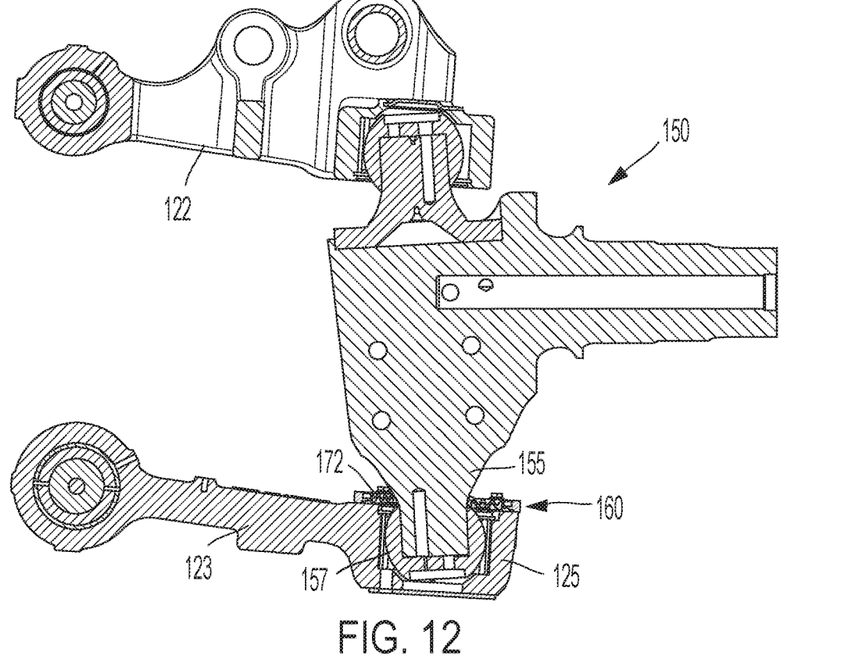
FIG. 12 shows the suspension system or assembly of FIG. 6 in an extended state.
Figure 13:
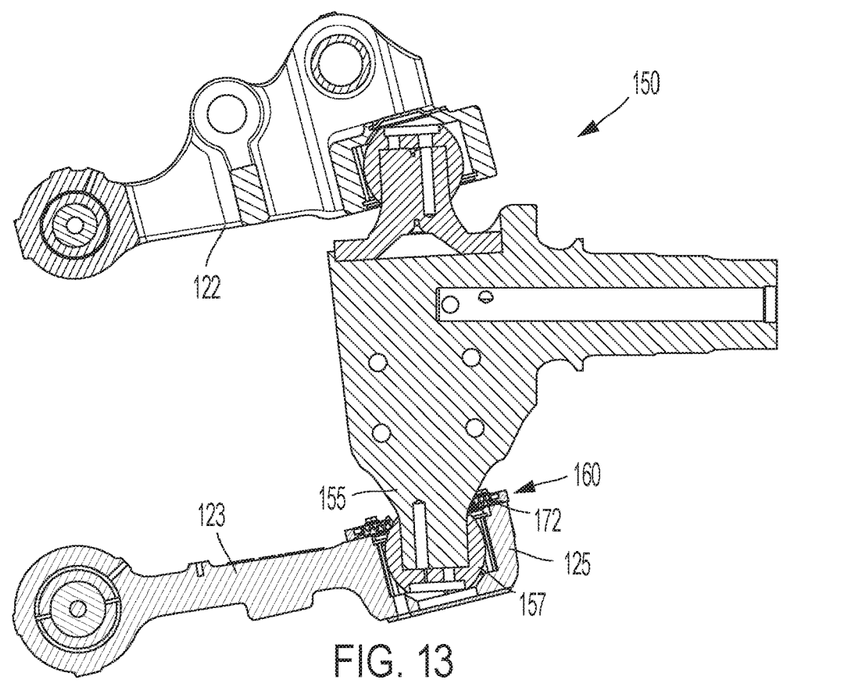
FIG. 13 shows the suspension system or assembly of FIG. 6 in a collapsed stated.

FIG. 12 and FIG. 13 show the spindle assembly 150 in various tilt states. More specifically, FIG. 12 shows the spindle assembly 150 in an extended state, and FIG. 13 shows the spindle assembly 150 in a compressed state. Such states may be representative of extreme states of the spindle assembly 150, a fully extended state and a fully collapsed state, respectively, and states therebetween, such as an unloaded or middle state such as shown in FIGS. 7, 8, and 11, and a fully loaded state, which may be about 80% of the state shown in FIG. 13. Incidentally, the fully extended state can be representative of a situation where the machine 10 is lifted off the ground and the suspension systems, including front suspension system 120, are able to fall freely under a weight thereof, and the fully collapsed state can be representative of a situation where all lubricant (e.g., grease, oil, etc.) is removed from a suspension system, such as the front suspension system 120, which can allow the suspension systems to fully collapse.

During tilt states the seal portion 172, 272 can simultaneously collapse and extend or expand in opposite directions on opposite sides of the seal portion 172, 272 based on the tilt of the spindle 155, all while maintaining sealing contact with the spindle 155. For example, as shown in FIG. 12, the seal portion 172, 272 can be collapsed to the left and expanded to the right when the spindle 155 tilts toward the control arm 123. And as shown in FIG. 13, the seal portion 172, 272 can be collapsed to the right and expanded to the left when the spindle 155 tilts away from the control arm 123. As noted above, the ball 157 can maintain contact with the seal portion 172, 272, particularly the contact surface 174, 274 thereof, during the tiling of the spindle 155 relative to the control arm 123.

Though the figures show seal assemblies 160, 260 provided relative to control arm 123, embodiments of the disclosed subject matter may not be so limited, and seal assemblies, such as seal assemblies 160, 260 can be provided in other contexts, such as control arm 122 and an interface with a corresponding spindle, or in other systems (including non-suspension systems) that implement a linkage with a spherical bearing.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A suspension system comprising:
   a control arm configured to extend primarily horizontally, the control arm defining a cavity and having a mounting surface surrounding a rim of the cavity;
   a spindle operatively coupled to the control arm and configured to extend primarily vertically, the spindle having an end portion provided in the cavity of the control arm and a body portion provided outside the cavity of the control arm;
   a ball provided at the end portion of the spindle and configured to tilt in correspondence with tilting of the spindle; and
   a seal assembly provided outside the cavity and sealingly coupled to the mounting surface of the control arm and an outer circumferential surface of the spindle, the seal assembly including:
   an undulating seal surrounding a circumference of the spindle and provided in friction-fit contact with the outer circumferential surface of the spindle, the undulating seal having an undulating configuration of alternating peaks and valleys,
   a metallic plate bonded to the undulating seal at least at an outer peripheral surface of the undulating seal, and
   an outer ring fixedly coupled to the mounting surface of the control arm and circumferentially surrounding the metallic plate and the undulating seal,
   wherein the metallic plate bonded to the undulating seal is configured to rotate in combination relative to the mounting surface of the control arm.

2. The suspension system according to claim 1, further comprising a lip seal provided between a radially inward facing surface of the outer ring and a radially outward facing surface of the metallic plate, the lip seal being provided on a radially inward extending ledge of the outer ring that extends from the radially inward facing surface of the outer ring.

3. The suspension system according to claim 1, wherein an outer ledge of the metallic plate is between the mounting surface of the control arm and a radially inward extending ledge of the outer ring.

4. The suspension system according to claim 1, further comprising a retaining ring provided on a side of the undulating seal facing the cavity, in one of said valleys of the undulating seal closest to the outer circumferential surface of the spindle, the retaining ring being configured to provide a retaining force against the undulating seal to hold the undulating seal against the outer circumferential surface of the spindle.

5. The suspension system according to claim 1, further comprising a lubricant path defined from the cavity, to under the metallic plate and radially outward toward the outer ring via a plurality of cutouts provided on bottom and radially outward side surfaces of the metallic plate, to between a lip seal and the metallic plate, and to an exterior surface of the sealing assembly from between the lip seal and the metallic plate.

6. The suspension system according to claim 1, wherein an upper portion of the ball is in direct contact with a side of the undulating seal facing the cavity, against one of said peaks of the ripple seal closest to the outer circumferential surface of the spindle.

7. A seal assembly configured to sealingly enclose a cavity of a control arm within which a spherical bearing linkage is provided, the seal assembly comprising:
   a seal portion having an undulating configuration of at least one peak and at least one valley in a radial direction;
   a plate bonded to the seal portion and circumferentially surrounding the seal portion;
   an outer ring circumferentially surrounding the plate and the seal portion; and
   a lip seal sealingly coupled to a radially inward facing surface of the outer ring and a radially outward facing surface of the plate.

8. The seal assembly according to claim 7, further comprising a ring, wherein the undulating configuration of the seal portion includes a plurality of alternating peaks and valleys, including said at least one peak and at least one valley, the ring being provided in a radially inner-most one of said valleys of the seal portion, and the ring providing a radially inward force against the seal portion.

9. The seal assembly according to claim 7, wherein in a side elevational view at least one peak of said at least one peak of the seal portion extends above respective uppermost and lowermost surfaces of the outer ring.

10. The seal assembly according to claim 7, wherein the plate includes one or more channels provided at least in bottom and radially outward facing side surfaces thereof, each of the one or more channels defining a portion of a lubricant path.

11. The seal assembly according to claim 7, further comprising a lubricant path, the grease path being defined by at least one channel provided in bottom and radially outward facing side surfaces of the plate, between the outer ring and the plate, and between the lip seal and the plate.

12. The seal assembly according to claim 7, wherein the seal portion is configured to surround a circumference of the spindle and be provided in friction-fit contact with an outer circumferential surface of the spindle, and the plate is configured to be rotatably coupled to a mounting surface of the control arm surrounding a lip of the cavity.

13. The seal assembly according to claim 7, wherein the plate is made of metal and the seal portion is made of a non-metallic material.

14. The seal assembly according to claim 7, wherein the outer ring includes a radially inward extending ledge on which the lip seal is provided, the radially inward extending ledge being between a portion of the plate and the lip seal.

15. A circular planar seal comprising:
a seal portion having an undulating configuration of alternating peaks and valleys in a radial direction; and
a plate portion fixed to the seal portion and circumferentially surrounding the seal portion,
wherein the seal portion is made of a first material and the plate portion is made of a second material more rigid than the first material,
wherein the seal portion has a radially inward facing contact surface that defines a central opening of the circular planar seal, and
wherein the plate portion includes a plurality channels, each of the channels having a first portion provided in a bottom surface of the plate portion that extends from an inner circumference of the bottom surface radially outward toward an outer circumference of the bottom surface, and a second portion provided in a radially outward facing side surface of the plate portion that extends vertically from the outer circumference of the bottom surface.

16. The circular planar seal according to claim 15, wherein the plate portion includes a vertical portion and a horizontal portion extending radially outward relative to the vertical portion, the vertical portion being fixed to an outer peripheral surface of the seal portion, and the horizontal portion forming a base for the circular planar seal.

17. The circular planar seal according to claim 15, wherein the channels are evenly spaced around a periphery of the plate portion.

18. The circular planar seal according to claim 15, wherein in a side elevational view of the circular planar seal a portion of the radially inward facing contact surface of the seal portion is at a height above an uppermost surface of the plate portion.

19. The planar seal according to claim 15, wherein a bottom interface between the seal portion and the plate portion is recessed relative to a bottom surface of the plate portion.

* * * * *